(12) United States Patent
Johnson et al.

(10) Patent No.: US 8,260,190 B2
(45) Date of Patent: Sep. 4, 2012

(54) METHOD AND ASSOCIATED DEVICE FOR PREVENTING UMTS CALL SETUP IN NEARBY MOBILE PHONES

(75) Inventors: Michael L. Johnson, Chicago, IL (US); Aaron S. Madsen, Mount Prospect, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 529 days.

(21) Appl. No.: 12/577,872

(22) Filed: Oct. 13, 2009

(65) Prior Publication Data

US 2011/0086590 A1 Apr. 14, 2011

(51) Int. Cl.
*H04K 3/00* (2006.01)
(52) U.S. Cl. .......................................................... 455/1
(58) Field of Classification Search ............ 455/1, 63.1, 455/67.13; 342/14
See application file for complete search history.

(56) References Cited

U.S. PATENT DOCUMENTS

| 7,103,310 | B2 | 9/2006 | Lucidarme |
| 2004/0032841 | A1* | 2/2004 | Jeschke et al. ................ 370/335 |
| 2005/0193315 | A1* | 9/2005 | Bertinelli et al. ............. 714/758 |
| 2006/0105746 | A1 | 5/2006 | Pirila |

FOREIGN PATENT DOCUMENTS

WO WO2007073269 A1 6/2007

\* cited by examiner

*Primary Examiner* — Raymond Dean
(74) *Attorney, Agent, or Firm* — Anthony P. Curtis; Daniel R. Bestor (57) ABSTRACT

An interference device and method of interfering with signals from a UMTS base station in a particular area are disclosed. The interference device receives a signal from the base station intended for a mobile device to initiate a communication session. The interference device synchronizes to the S-CCPCH and alters the TCFI and/or the data in the data field of the slot so that it is not longer correct. Time-shifted copies of the altered signal are then multiplexed and transmitted to the mobile device as a jamming signal. The jamming signal is received by the mobile device and causes the mobile device to be unable to determine the data of the original signal from the base station.

20 Claims, 8 Drawing Sheets

FIG. 8 ized as the "first" and "second" elements).

METHOD AND ASSOCIATED DEVICE FOR PREVENTING UMTS CALL SETUP IN NEARBY MOBILE PHONES

TECHNICAL FIELD

The present application relates to network access of mobile devices. In particular, the application relates to a device and method for preventing network communications by UMTS mobile devices.

BACKGROUND

Mobile communication devices have become ubiquitous. Many mobile devices now use third-generation (3G) cell phone technologies. Universal Mobile Telecommunications System (UMTS) is one such technology which is gaining in popularity. UMTS uses Wideband Code Division Multiple Access (WCDMA) as a high speed transmission protocol to communicate with a base station (also called base transceiver station or Node B) in the infrastructure of the network. Networks are formed from adjacent overlapping cells of radio coverage. WCDMA is used to achieve cell separation and thereby minimize problems caused by interference between neighboring cells.

However, a number of problems may exist with the UMTS mobile devices being present everywhere. In particular, there are a number of locations in which it is undesirable for UMTS mobile devices to be able to send or receive calls or messages. Examples of such locations include public or private venues in which privacy, quiet, and/or security may be important, e.g., libraries, laboratories, auditoriums, lecture halls, classrooms, or theatres.

To block the signal, a more powerful signal may be continually broadcast at the frequency that the base station uses to communicate with the UMTS mobile devices (downlink frequency) or at the frequency that the UMTS mobile devices use to communicate with the base station (uplink frequency) to overwhelm the actual communication signal. However, such a technique is power-intensive, especially to cover typical geographical areas over which blocking is desired (and in light of the advanced coding and error-correction techniques developed), making it impractical to use in a self-powered (battery) mobile blocking device. Moreover, this technique is intrusive, blocking all signals at these frequencies—not merely signals between the base station and the UMTS mobile devices. In addition, devices are increasingly capable of operating over different frequency bands, requiring the blocking device to overwhelm signals over multiple different frequency bands.

It is desirable to block communication between the UMTS mobile devices in a particular location and the base station serving the location without engendering the above problems.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts of the invention defined by the claims, and explain various principles and advantages of those embodiments.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments. Also, common but well-understood elements that are useful or necessary in a commercially feasible embodiment are often not depicted to facilitate viewing clarity. It will further be appreciated that certain actions and/or steps may be described or depicted in a particular order of occurrence while those skilled in the art will understand that such specificity with respect to sequence is not actually required.

DETAILED DESCRIPTION

Before describing in detail various embodiments, it should be observed that such embodiments reside primarily in combinations of method steps and apparatus components that deny users of UMTS systems the ability to make or receive a call within a localized area using multiple time-differentiated copies of a jamming signal from an interference device.

Certain portions of this application, such as the Abstract and Summary, are provided to allow the reader to quickly ascertain the nature of the disclosure. They are submitted with the understanding that they will not be used to interpret or limit the scope or meaning of the claims or of the invention, which is defined by the claims. In addition, in the Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the claims are hereby incorporated into the Detailed Description, with each claim standing on its own as a separately claimed subject matter.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

It will be appreciated that the embodiments described herein may be comprised of one or more conventional processors and unique stored program instructions that control the one or more processors to implement, in conjunction with certain non-processor circuits, some, most, or all of the functions of providing communication redundancy as described herein. The non-processor circuits may include, but are not limited to, a radio receiver, a radio transmitter, signal drivers, clock circuits, power source circuits, and user input devices. As such, these functions may be interpreted as steps of a method for providing communication redundancy. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Figure 1:
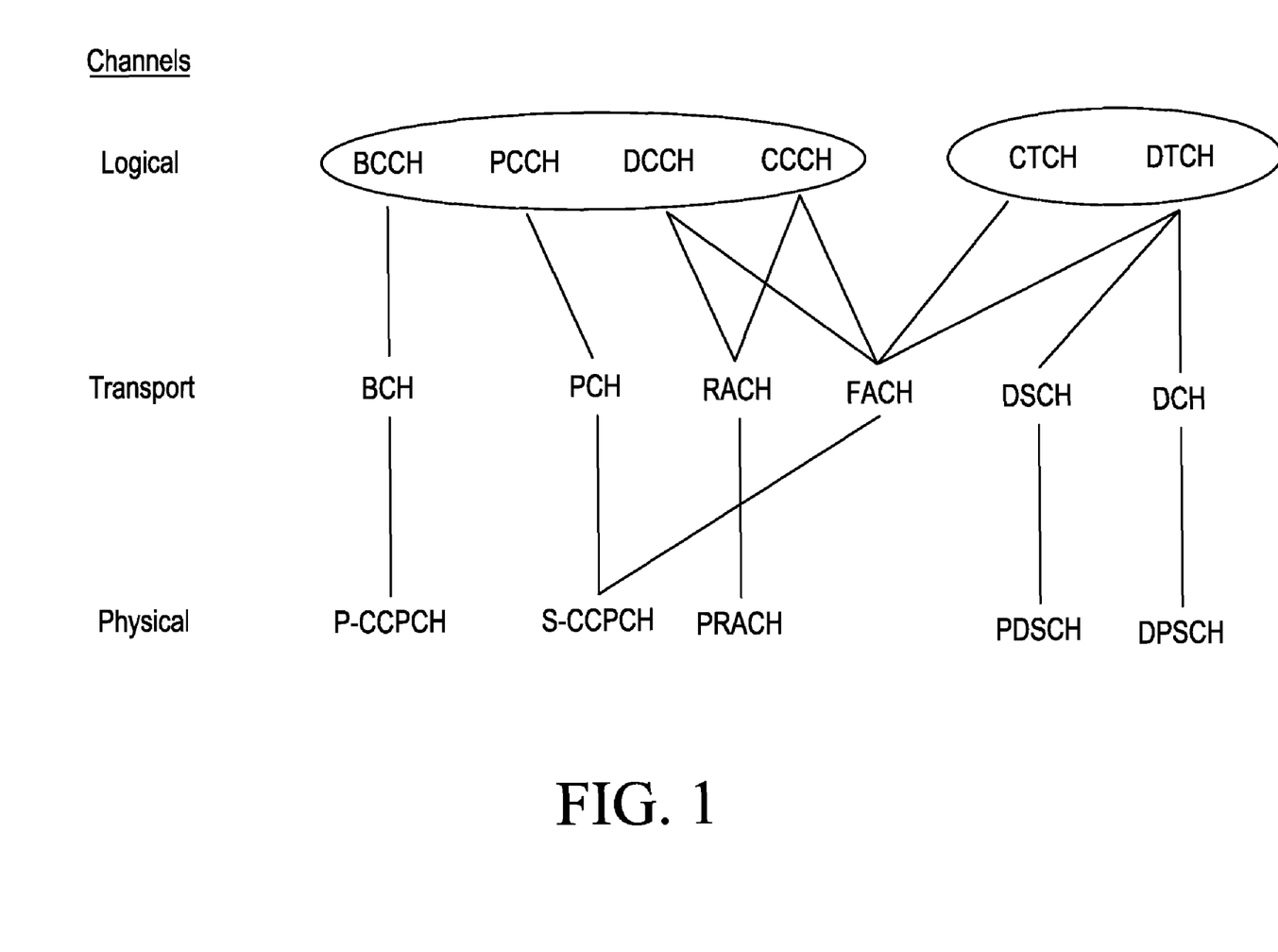
FIG. 1 illustrates the various channels in a UMTS communication system.

As shown in FIG. 1, several types of channels exist in UMTS communications. These include physical, transport, and logical channels. The physical channels include P-CCPCH (Primary Common Control Physical Channel), S-CCPCH (Secondary Common Control Physical Channel), PRACH (Physical Random Access Channel), PDSCH (Physical Download Shared Channel), and DPDCH (Dedicated Physical Data Channel). The physical channels may be multiplexed/demultiplexed into transport channels. The transport channels include BCH (Broadcast Channel), PCH (Paging Channel), RACH (Random Access Channel), FACH (Forward Access Channel), DSCH (Downlink Shared Channel), and DCH (Dedicated Channel). The logical channels include the BCCH (Broadcast Control Channel), PCCH (Paging Control Channel), DCCH (Dedicated Control Channel), CCCH (Common Control Channel), CTCH (Common Traffic Channel), and DTCH (Dedicated Traffic Channel).

The physical channels include P-CCPCH, S-CCPCH, PRACH, PDSCH, and DPDCH. There is only one P-CCPCH within a cell in the network. It carries synchronization and broadcast information for users within the cell. The S-CCPCH carries the FACH and PCH. The PRACH carries the RACH. The PDSCH carries the DSCH and is the only downlink transport channel available to carry user data between a mobile device and base station (also called NodeB). The DPDCH carries the DCH and is an uplink dedicated physical channel.

The transport channels include the BCH, PCH, RACH, FACH, DCH and DSCH. The transport channels link the physical channels with the logical channels and permit coding and other mechanisms to increase the network reliability (which is compromised by signal problems such as interference, fading and masking). The transport channels represent the manner in which information is transmitted (e.g., the data format and transmission method as defined by the transport format set). The transport format has a static portion common to all transport formats and a dynamic portion that includes the block size and the block set size. The static portion includes the transmission time interval or TTI (the periodicity at which the transport block set is transferred over the radio interface), the type of channel coding used (e.g., turbocode, convolutional code), the size of the cyclic redundancy check (the number of bits added for detecting transmission errors), and the channel coding rate (the number of bits transmitted over the interface for each bit of information).

The BCH is a downlink transport channel that is used to broadcast cell and system information. The BCCH maps into the BCH transport channel. The PCH is a downlink transport channel that carries the PCCH. It is used to broadcast paging and notification messages in a cell. The PCH is transported in the S-CCPCH and is used to alert a mobile device that there is a call or text message waiting. The RACH is used for initial access into a system. The FACH is used for signaling and small quantities of data. The RACH and FACH are downlink channels. The DSCH is a transport channel similar to the FACH that may be shared by several mobile devices and typically carries dedicated control or traffic data from the Serving Radio Network Controller. The DSCH is typically associated with several downlink DCHs. The DCH is a bidirectional channel allocated to an individual mobile device.

The logical channels correspond to the different types of information carried by the interface and include control channels that carry information on the control plane and traffic channels that carry data on the user plane. The logical control channels include the BCCH, PCCH, CTCH, CCH and DCCH. The BCCH is a downlink control channel that contains specific parameters (system information) needed by a mobile device so that it can identify and access the network. The PCCH is used to send paging messages to mobile devices. The CCCH supports common procedures required to establish a dedicated link with the network. The CCCH is used to exchange control information with mobile devices not already connected with the network (e.g., the initial signaling messages). The DCCH is a point-to-point bidirectional channel that transmits dedicated control information between mobile devices already connected to the network and the network.

The logical traffic channels include the CTCH and DTCH. The CTCH is a point-to-multipoint unidirectional channel for transfer of dedicated user data from the network to a group of mobile devices. The DTCH is a point-to-point bidirectional channel dedicated to one mobile device for the transfer of user data between the mobile device and the network.

The interference device disclosed herein corrupts signals between mobile devices disposed within an area in which it is desired to block data (user directed or generated content such as voice, video, instant messages, etc.) and the network. More specifically, the interference device blocks the S-CCPCH (and thus PCH and FACH) signals. Thus, the remainder of this description will focus on these channels.

Figure 2:
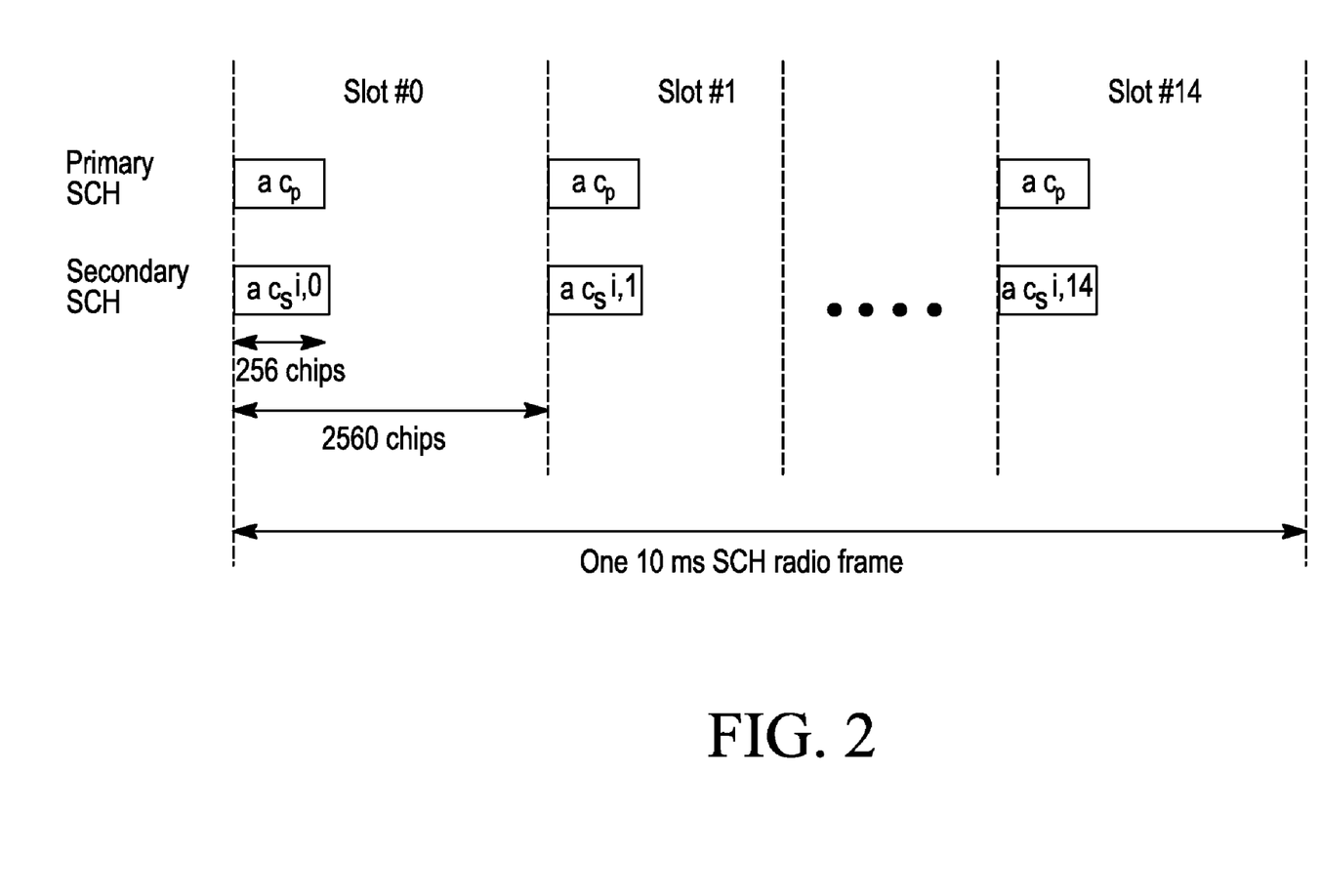
FIG. 2 illustrates a frame of a transmission in the UMTS system.

Transmission over a UMTS network is split up into 10 ms frames as shown in FIG. 2. Each frame contains 15 slots of 0.67 ms. The UMTS chip rate is 3.84 Mcps, so slot contains 2560 chips. When the mobile device is switched on, in the absence of previously-stored knowledge of its environment, the mobile device searches for properties of three physical channels: the primary synchronization channel (P-SCH), secondary synchronization channel (S-SCH), and common pilot channel (CPICH). The P-SCH is formed from a primary synchronization code of 256 chips, repeated every slot, and is the same for all cells in the UMTS network. The S-SCH is formed from a geographical-uniquely identified set of 15 secondary synchronization codes of 256 chips that differ dependent on the slot in which the secondary synchronization code is transmitted. The secondary synchronization code is denoted $c_s^{i,k}$ in FIG. 2, where i=0, 1, . . . , 63 is the number of the scrambling code group, and k=0, 1, . . . , 14 is the slot number. Each secondary synchronization code is chosen from a set of 16 different codes of length 256 chips. This sequence on the S-SCH indicates to which of the code groups the cell's downlink scrambling code belongs. The primary and secondary synchronization codes are transmitted at the same time. The CPICH (not shown) is broadcast to all cells in the network and made up of a symbol sequence known to the mobile devices but scrambled by a primary scrambling code.

When the mobile device finds one or more P-SCHs, the mobile device attempts to synchronize with the slots of the base station having the strongest P-SCH by correlating to the primary synchronization code. The slot timing of the cell can thus be obtained by detecting peaks in the output of a filter matched to the primary synchronization code. Once the mobile device is synchronized to the slots, the mobile device attempts to synchronize with the frames. The mobile device recovers the secondary synchronization code during slot synchronization and determines when frames on the common control channels are sent on the cell. This is done by correlating the received signal with all possible secondary synchronization code sequences and identifying the maximum correlation value. Since the cyclic shifts of the sequences are unique, the code group as well as the frame synchronization is determined After synchronizing to the frames, the mobile device determines the primary scrambling code used by the cell. The primary scrambling code is identified through symbol-by-symbol correlation over the CPICH with all codes within the code group identified during frame synchronization. After the primary scrambling code has been identified, the P-CCPCH can be recovered and decoded, allowing the system- and cell specific BCH information to be read.

Figure 3:
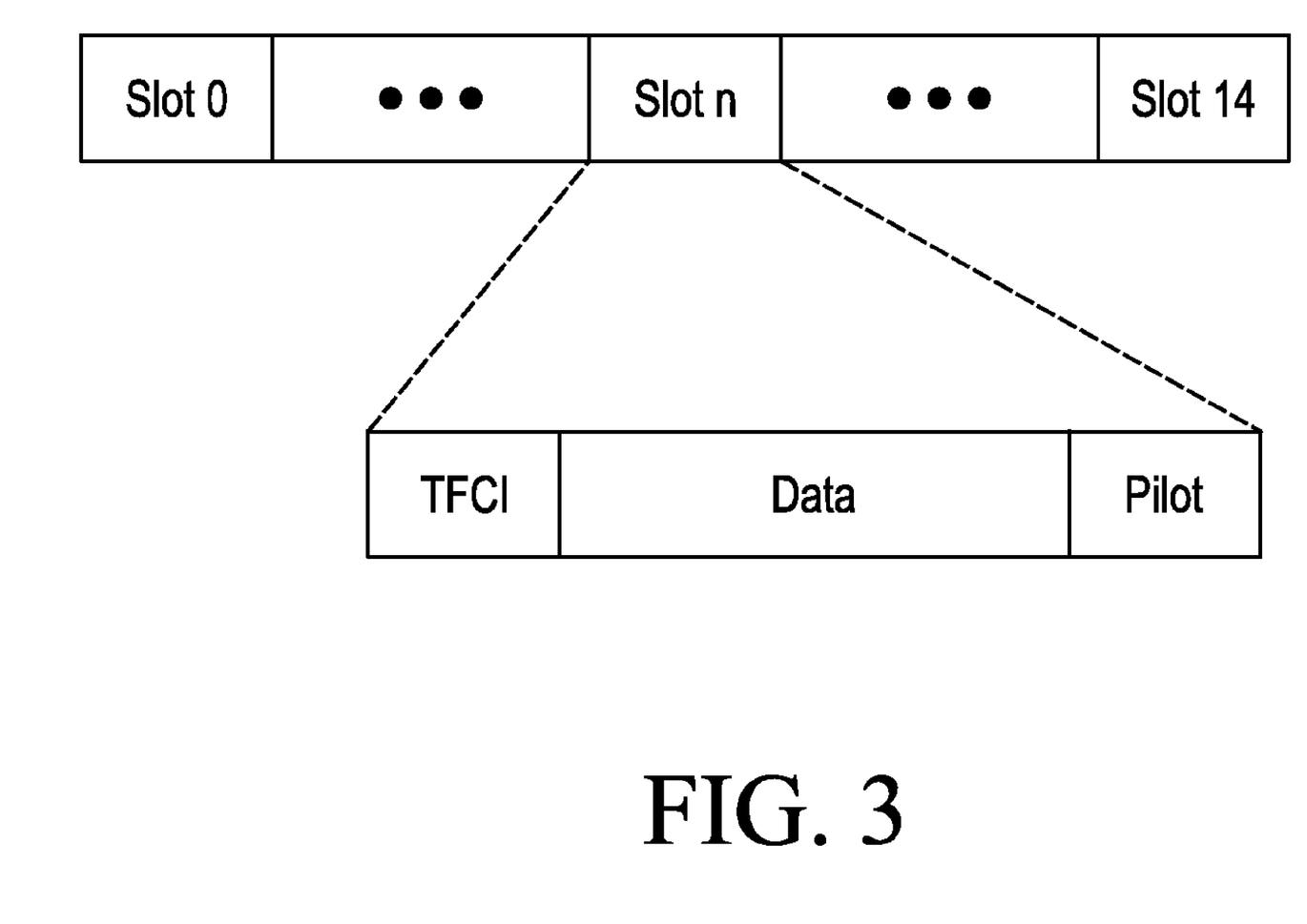
FIG. 3 illustrates a slot configuration in the UMTS system.

After synchronization, as above, the S-CCPCH is used to support the FACH and PCH. The S-CCPCH frame is formed from 15 slots, as shown in FIG. 3. Each S-CCPCH slot is able to carry up to one PCH transport channel and up to several FACH transport channels. The different combinations of the transport channels carried by the S-CCPCH slot are called Transport Format Combinations (TFC). The TFCs are enumerated and the particular TFC used by the S-CCPCH slot is identified by a Transport Format Combination Indicator (TFCI). The TFCI bits may be transmitted or the mobile device may have to deduce the format based what is received; regardless, all mobile devices within the cell must determine the TFC to decode the S-CCPCH. The TFC, and thus TFCI, may change over time. The TFC defines the number and size of transport blocks for each transport channel.

A data field succeeds the TFC field. The data field contains data bits—data packets or signalling messages for a user in the FACH or paging messages in the PCH. The TFCI provides the information about the content of the data field. A Pilot field containing pilot bits may succeed the data field. The pilot bits constitute a pilot signal that allows the mobile device to optimize the equalization of the data received on the S-CCPCH. The pilot bits and TFCI bits indicating the format of the data part of the S-CCPCH frame constitute physical layer control information. The S-CCPCH can take any of 18 different formats depending on the spreading factor chosen by the network and the number of pilot and TFCI bits used. Each of the power levels of the various portions of the slots may be different.

Figure 4:
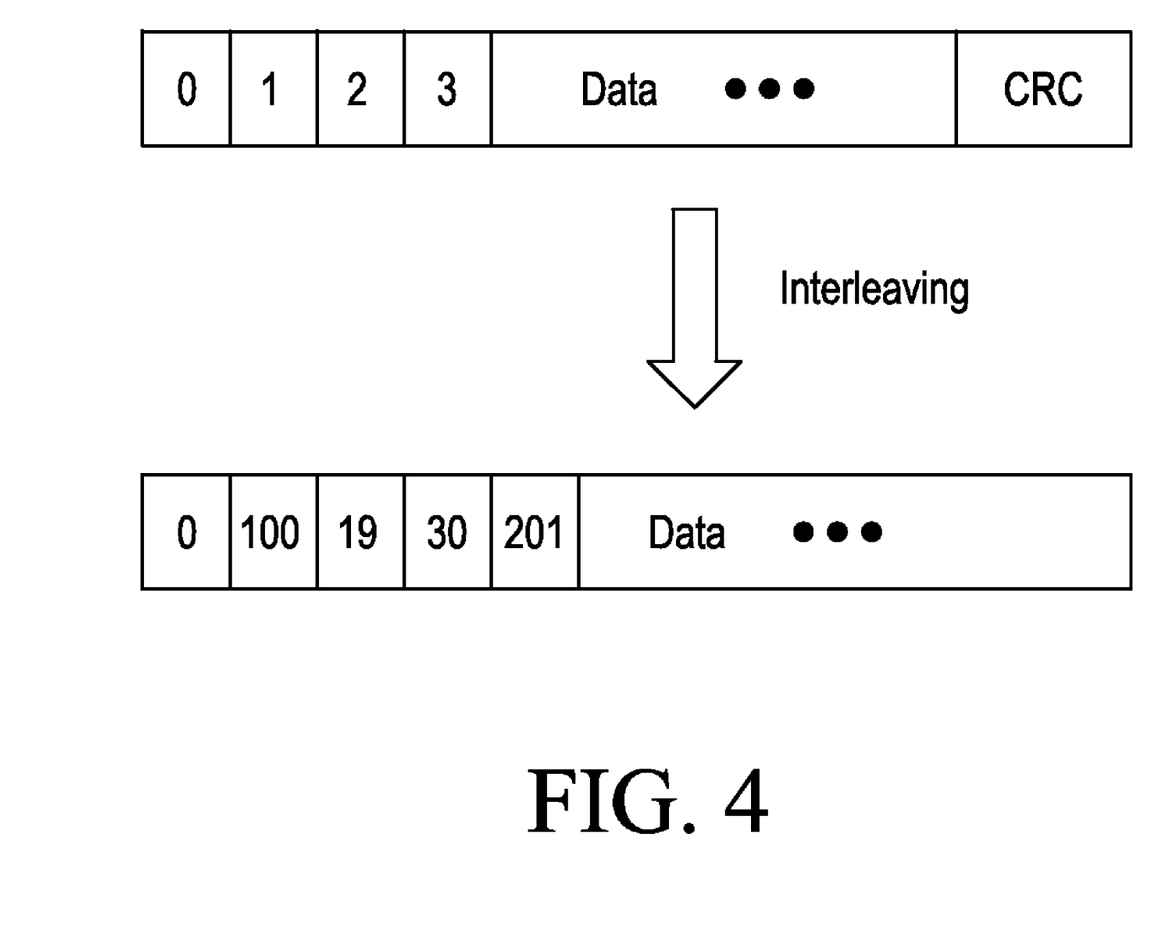
FIG. 4 shows an example of the manner in which the data bits in a slot are altered when encoded.

As indicated above, the base station (node B) uses WCDMA/TD-SCDMA as the air transport technology. The CDMA coding is used in the PHY layer to provide access to multiple channels and/or users in the same spectrum. The spreading code is generated by a pseudo-random noise (PN) code generator that generates a much higher rate data stream than the information to be transmitted. This combination spreads the bandwidth of the information data stream. The same spreading code is known by the mobile device, which isolates and demodulates the signal using the spreading code to compress the signal and permit recovery of the original data. Error detection and correction coding is done by the base station (and in the mobile devices) and, like the data carried, can change from TTI to TTI during the course of a call. In order to allow the signal to tolerate various impairments that exist in a wireless communications channel, the data is additionally encoded with interleaving and error correcting and detecting codes. The interleaving and coding result in the data structure changing, for example, as shown in FIG. 4. The original data bits, shown at the top, are ordered sequentially and may be followed by a Cyclic Redundancy Check (CRC). They are then interleaved producing the result shown at the bottom of FIG. 4.

Figure 5:
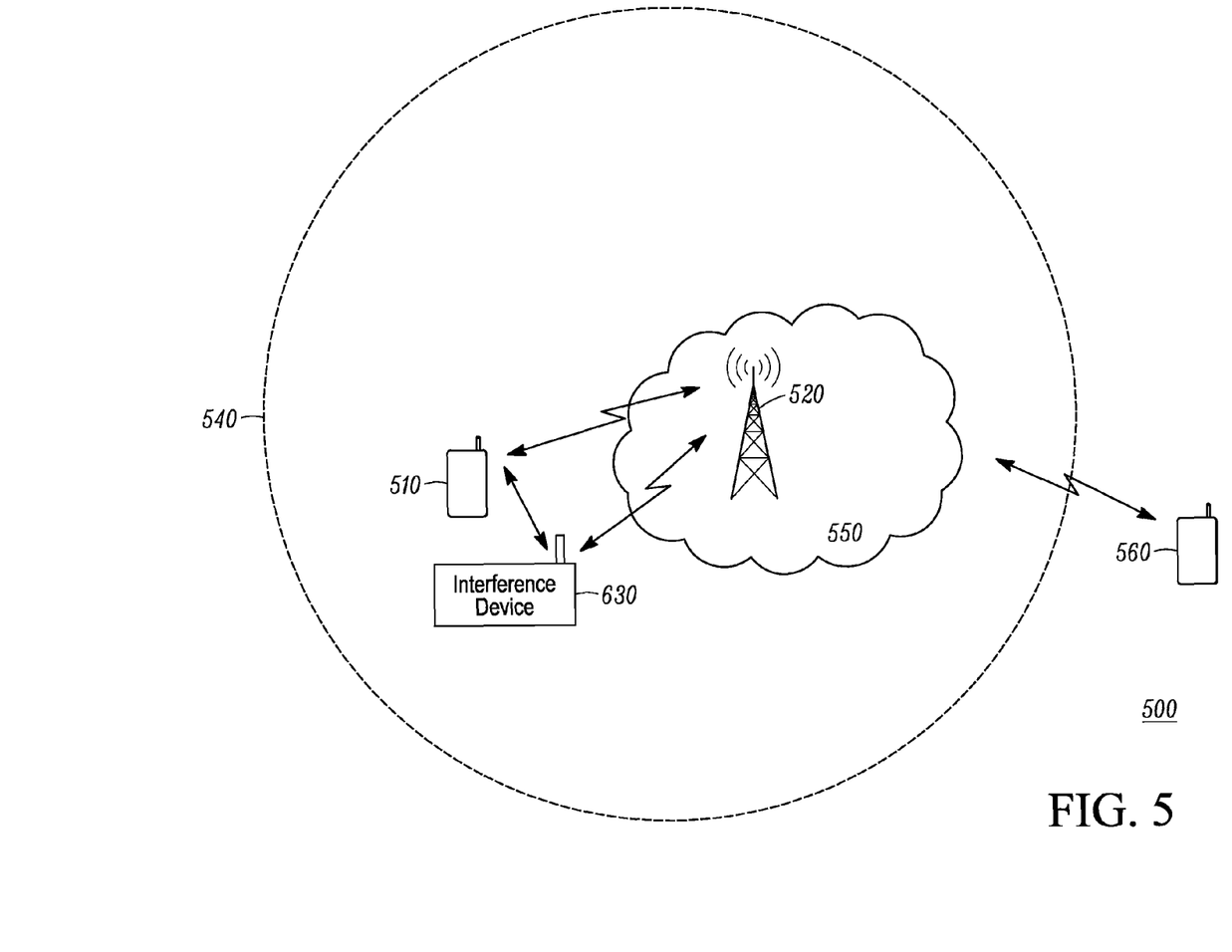
FIG. 5 illustrates a UMTS system according to one embodiment.

In the embodiment shown in FIG. 5, the UMTS network 500 includes UMTS mobile devices 510, 560 an infrastructure 550 containing a base station 520, and an interference device 530. The base station 520 provides radio service to mobile device 510 in a cell 540 serviced by the base station 520 (as well as other mobile devices that may be within the cell 540). The S-CCPCH transmits the paging channel PCH and one or more forward access channels FACH from the base station 520 to the mobile device 510. The mobile device 510 is within the area in which it is desired to disrupt wireless communications with the base station 500 while the mobile device 560 is in a different geographical area and, under normal conditions would communicate with the mobile device 510 through the infrastructure 550. The infrastructure 550 contains base stations, controllers, dispatch consoles, servers, wired and/or wireless communication links, and other known devices.

The interference device 530 provides jamming signals that are effective to disrupt communications between the mobile device 510 and the base station 520. The jamming signals are superposed with the actual signals such that the mobile device 510 is unable to interpret the information and therefore to establish a connection. The interference device 530 may be a stationary device that remains in a stationary geographical area over which the interference is effective. Alternatively, the interference device 530 may be a mobile device in which the geographical area over which the interference is effective moves as the device moves. The interference device 530 may be powered through portable equipment, such as one or more batteries, or may be plugged into a wall socket.

The interference device 530 uses the standard signaling techniques of the UMTS system 500 to only corrupt a particular part of the transmission from the base station 520. The interference device 530 is disposed within the same general area, described below, of the mobile device 510 to be effective. The interference device 530 is able to detect signals transmitted from the base station 520 to be received by the mobile device 510 and, in response, transmit a corruption signal to the mobile device 510. The corruption signal is able to prevent, within a given failure rate, the mobile device 510 receiving the corruption signal from determining that a valid signal was transmitted from the base station 520 to the mobile device 510.

The interference device 520 contains, among other electronic components, a receiver to receive signals at the UMTS downlink frequency, a transmitter to transmit signals at the UMTS uplink or downlink frequency, and hardware and/or software that detects and decodes the signals from the base station 520 and encodes the signals to the mobile device 510. The hardware may include, for example, a microprocessor, a field-programmable gate array (FPGA), an application-specific integrated circuit (ASIC), or the like.

As indicated above, in one method for jamming calls, the interference device sends a high power interference signal in the frequency on which the base station operates. However, these high power interference signals use a substantial amount of energy as well as disrupting all RF activity at this operating frequency, often causing equipment (e.g., other non-UMTS devices) other than the desired targets in the area to not operate properly as well as blocking other systems far outside the area. Furthermore, an increasing number of mobile devices operate in multiple bands; accordingly, disrupting a signal in this way at one frequency merely causes the mobile devices to switch to service using a different frequency thereby defeating the purpose of the interference device.

The interference device may in another method rely on the detection of the preamble from the mobile devices, and then attempt to interfere with the resulting response from the base station. However, the preamble is a short burst that starts at a relatively low power and slowly increases in power until the base station responds. Depending on the environment, it may be difficult for the interference device to detect the preamble and thus block initial communication between the mobile device and the base station. Moreover, the timing to detect the preamble and to generate and transmit a corruption signal to the mobile device to corrupt the access grant may be problematic. If the preamble is not detected or the corruption signal does not reach the mobile device in time, the access grant from the base station will not be blocked and the call will be completed.

In addition, as mentioned above, the preamble is transmitted by the mobile device at increasing power until the base station detects it. Thus, the interference device has to react to each of these transmissions whether or not the base station detects the particular transmission from the mobile device. This leads to unnecessary transmissions of the corruption signal for the preambles that are not detected by the base station, which in turn increases power consumption of the interference device without providing any useful result. Furthermore, as the access grant is encoded with a simple, robust repetition code to prevent corruption of the access grant, the power consumption of the interference device is further increased relative to a signal that does not have such a robust code.

If multiple mobile devices are present in the desired area, they may each attempt to communicate with the base station at or near the same time. The multiple preambles transmitted by different mobile devices may be received differently at the base station than at the interference device. This may lead to the interference device not detecting either (or detecting only one) preamble because of a collision while the base station receives one or both correctly and responds accordingly. In this case, at least one of the access grants will not be blocked and that call will be successfully completed.

The interference device also transmits jamming signals on the same UMTS downlink frequency as the base station. The interference device is thus unable to monitor communications from the base station at the same time that it is transmitting the corruption signal. The interference device is also unable to search for other base stations that may overlap and be transmitting to the same area and respond to mobile devices in the area. In particular, because the interference device transmits on the downlink, remaining synchronized with the base station is a significant challenge, increasing system complexity and power consumption. To reduce power consumption and limit the probability of false positive preamble detections, the interference device may only look for preambles at certain predetermined times based on the timing of the received downlink, which may be problematic if synchronization with the base station is not maintained. Similarly, if the interference is continuously transmitted, maintaining synchronization with the base station is at best problematic.

The latter known method above also assumes a base station communicating with the mobile device using a single antenna. However, the system may use STTD-based (Space-Time Transmit Diversity) open loop transmit diversity, in which the base station uses multiple antennae to respond to the same preamble. This further increases the complexity of the interference device as it must take the transmission diversity into account to be effective.

Even if the preamble detection technique is able to adequately address these issues, as the response from the base station is an uncoded real valued vector, the interference signals may merely convert the value to a different vector without converting the value to an incorrect state (as all possible values are valid).

The interference device of the present embodiments overcomes such problems. The jamming signal is generated by the interference device 530 specifically on the S-CCPCH of the UMTS system 500. In particular, instead of transmitting the legitimate S-CCPCH channel data of the base station 520, arbitrary values are encoded and transmitted using the S-CCPCH spreading and scrambling codes. Listening to a particular channel and transmitting only at the appropriate times permits the interference device 530 to intermittently re-synchronize to the base station 520 at other times without substantially impacting the ability to interfere with communications. In addition, this technique conserves power by using the same relatively-low power transmission (e.g., encoding) techniques as the mobile device 510. Due to the physical separation geometries of the mobile device 510, base station 520, and interference device 530, and the propagation delay of the UMTS signal from the base station, the physical distance in which the jamming signal can be guaranteed to arrive during a desired period can be as small as 30 meters. To increase this effective distance, multiple time-shifted copies of the jamming signal are sent from the interference device 530 to take advantage of particular aspects of the receiver in the mobile device 510.

In more detail: in most environments, such as a typical urban environment, transmissions from the base station to the mobile device 510 (and vice-versa) take multiple paths due to encountering objects in the signal path. This leads to the mobile device 510 receiving multiple signals containing the same information at different times, power levels, and amounts of distortion due to the different path lengths and amounts of interference along the different paths. Although it is possible to only process the strongest signal, most mobile devices combine all contributions within a particular time window to benefit from the path diversity and mitigate the effects of multipath interference using a rake receiver. The width of this window may be predetermined or dynamic, being selected to balance overall delay with signal quality and power consumption.

The interference device 530 uses the rake receiver to its advantage by generating, multiplexing and then transmitting time-delayed or time-advanced copies of the jamming signal to the mobile device 510. The copies are time-delayed or time-advanced by an integer multiple of chip periods. Due to the nature of the rake receiver in the mobile device 510, the copies of the jamming signal may arrive at the mobile device 510 at any point within the time window without being required to arrive at precisely the same time as the true multipath signals from the base station. Due to the spread spectrum nature of the UMTS scrambling codes, these multiple copies only minimally interfere with each other. The ability to time-delay or time-advance the signal permits the geometry of the interference device, the mobile device 510, and the base station to be relatively flexible, i.e., the interference device 530 to be disposed in a wide area and still be effective. The interference device 530 can be disposed at the base station 520 or elsewhere within the cell 540. With an increase in the number of different time-delayed copies multiplexed, the effective range increases as a greater number of copies are likely to arrive within the time window of the mobile device 510.

The interference device 530 transmits during every downlink frame, interfering with the S-CCPCH channel. This permits the interference device 530 to operate by transmitting only at predetermined times but without having to detect the relatively short preambles from the mobile device 510 attempting to contact the base station 520. Also, unlike previous jamming signals, jamming signal from the interference device 530 is able to affect parity protected data. This means that the resulting signal received at the mobile device, a combination of the true signal and the jamming signal, is interpreted to be in error. Data detected with errors is discarded.

There are a number of ways to effectively interfere with the signal from the base station 520. As shown in FIG. 3, the signal contains a TFC field as well as a data field. By replacing the actual TFCI with a different TFCI, the data bits will be incorrectly decoded, thereby corrupting the entire signal. Alternately, at least a minimum number of bits of the actual PCH channel or FACH channel PSK (phase shift key) or QPSK (quadrature phase shift key) data are changed to different values (i.e., 0->1, 1->0). This is shown in the flowchart of FIG. 7 and conceptual block diagram of the interference device 530 in FIG. 8 to accompany the flowchart.

Figure 7:
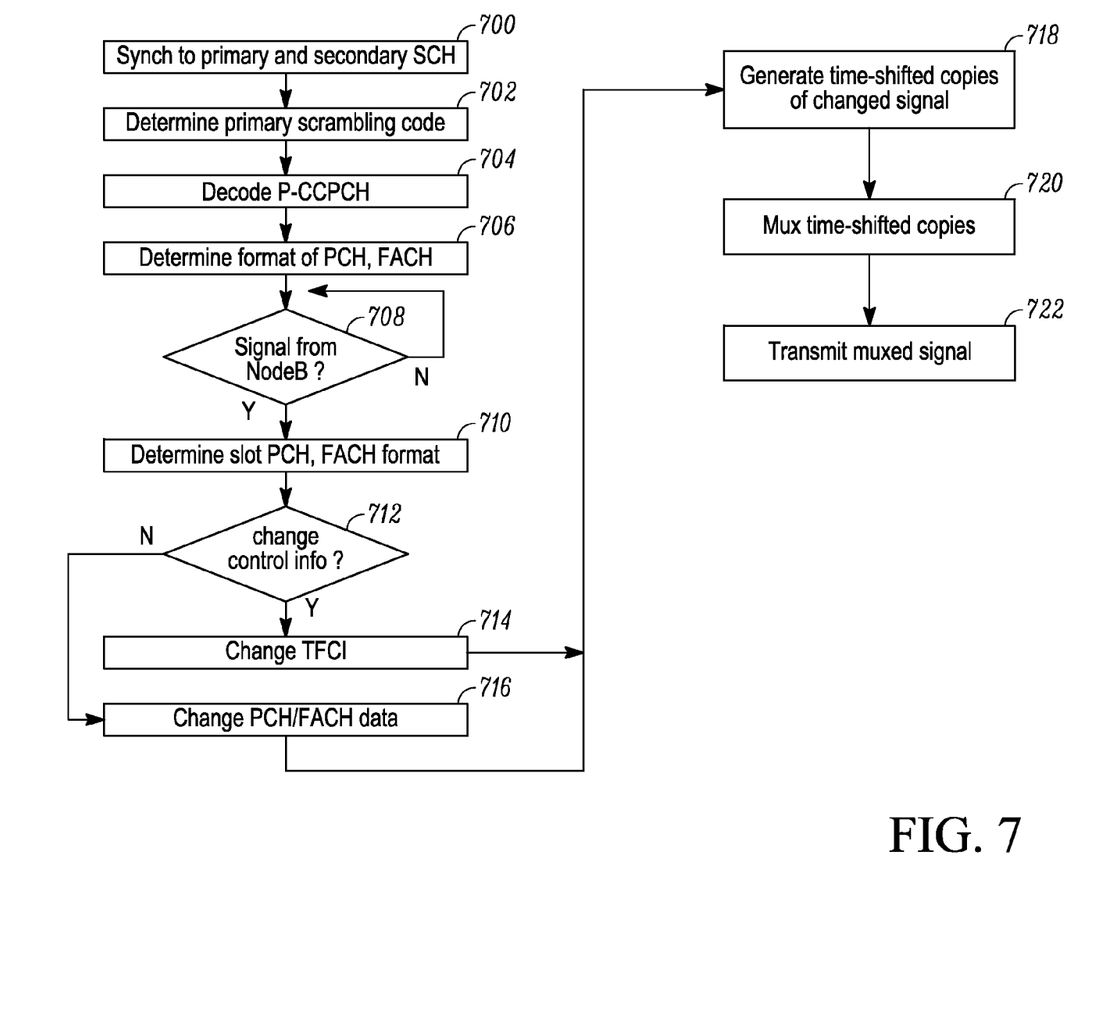
FIG. 7 is a flow chart of a method of disrupting communication in a UMTS mobile device according to one embodiment.
Figure 8:
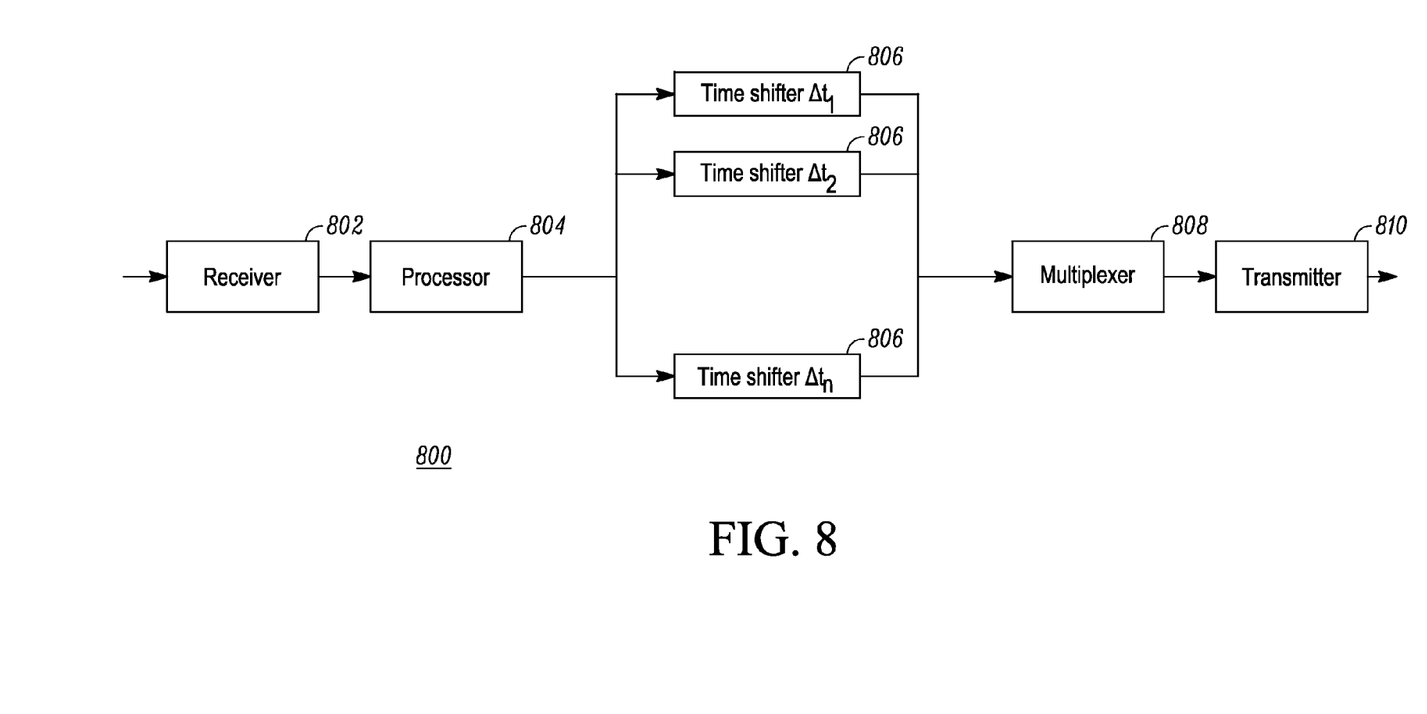
FIG. 8 shows elements in an interference device according to one embodiment.

In FIG. 7, when the interference device 800 is initially activated in the geographical area in which it is to be used, it determines features of messages from the base station, as described previously. Specifically, the interference device 800 listens to the base station, synchronizing to the base station and synchronizing to the primary and secondary SCH channels at block 700, determines the primary scrambling code at block 702 after synchronizing, decodes the primary CCPCH channel at block 704, and determines the format of the PCH and FACH channels at block 706. The interference device can then transmit interfering signals regardless of whether communications are occurring on the PCH or FACH. Alternately, if the interference device 800 detects that the base station is attempting to initiate communicate session with a mobile device (either as a result of the mobile device initiating the contact with the base station or vice-versa) at block 708 by receiving the information for the mobile device at the receiver 802, the processor 804 can determine the slot format of the PCH and FACH channels at block 710 by decoding the base station signal to find the TFCI and the interference device 800 proceeds to corrupt the base station signal.

More specifically, if it is desired to corrupt the control information of the base station signal at block 712, the interference device 800 changes the TFCI to a different value at block 714. This value can be selected either randomly or in a predetermined manner using a table of substitute values in a memory (not shown) connected to the processor 804. The TFCI is encoded with a Reed-Muller code. It may be corrupted by changing the value to an invalid value, by changing the value so that is different than the one that is actually present, or by changing the value to a TFCI that indicates that there is no data.

If it is desired to corrupt the data bits of the S-CCPCH signal at block 712, the processor 804 substitutes at least a minimum number of bits of the PCH and/or FACH channel signal at block 716. In one embodiment, only the values of the minimum number of data bits are changed to effect the desired jamming For example, as the interleaved positions of only three to four originally-consecutive bits (i.e., bits of the PCH and/or FACH channel signal before the coding and transmission by the base station) are determined, the bit values determined, and then these values are altered. The positions of these bits are known by the processor 804 as it has extracted the TFCI value and thus can determine where in the encoded signal the consecutive bits are disposed.

The minimum number of data bits is determined by the coding scheme as well as other variables from the TCFI, but is typically at least two bits and may be as many as five or six bits. The originally-consecutive data bits may be located at any point within the data field, although as the data field may not be completely filled, it may be more desirable to select the initial data bits or data bits near (within up to about a hundred or so data bits of) the initial data bits to guarantee that the bits are occupied by data intended for the mobile device. Depending on the TCFI of each slot, this minimum number can change from slot to slot. Only the minimum number may be changed or a larger number (e.g., up to about 2-3 times the minimum number) of consecutive data bits may be changed. Also, multiple sets of minimum consecutive data bits in each data field may be changed. Alternately, a random number and/or location of originally-consecutive bits may be changed, so long as the random number exceeds the minimum number. The information in each slot may not be changed so long as a sufficient number of slots in each frame are changed.

In addition, whether the TCFI or data bits are changed (as well as the location of the data bits) may vary from slot to slot. Note that if the TCFI is present, it can be changed without determining or changing the data bits in the data field. While the processor 804 can decode the signal, determine the bit values, change the values, and then re-encode the signal, this method is more computationally-intensive and thus less power-friendly. Thus, the processor 804 determines the characteristics of the message from the base station (either or both the TCFI or data of the slot) and changes at least one of these characteristics accordingly.

Whether the TFCI or the PCH and/or FACH channel signal data is changed, the interference device 800 generates time-shifted (i.e., advanced or delayed) copies of the altered signal at block 718 by supplying the signal to a desired number of time shifters 806. As above, the copies are shifted by different integral numbers of chips dependent on the time shift 806 through which the altered signal passes. These copies are then multiplexed together in the multiplexer 808 at block 720 to form the jamming signal. The jamming signal is then transmitted from the transmitter 810 of the interference device 800 to the mobile device at block 722. The number and spacing of the copies depends on the desired distance over which the jamming is desired, and the expected relative positions of the interference device and the mobile device.

As described, the jamming signal (TFCI and/or data bits) can be transmitted blindly or an active role can be taken by first determining whether the base station is transmitting and only afterwards transmitting the jamming signal. Thus, for example, blocks 708, 710 and 712 in FIG. 7 are optional. If the jamming signal is transmitted blindly, at each frame (or a sufficient percentage of frames for each group of frames in a TTI) independent of whether a signal from the base station is sensed, different sets of TFCI and/or data bits can be transmitted each frame or sets of frames to reduce the chances of inadvertently matching the actual data from the base station or to change the TFCI to indicate the TTI contains no data.

Figure 6:
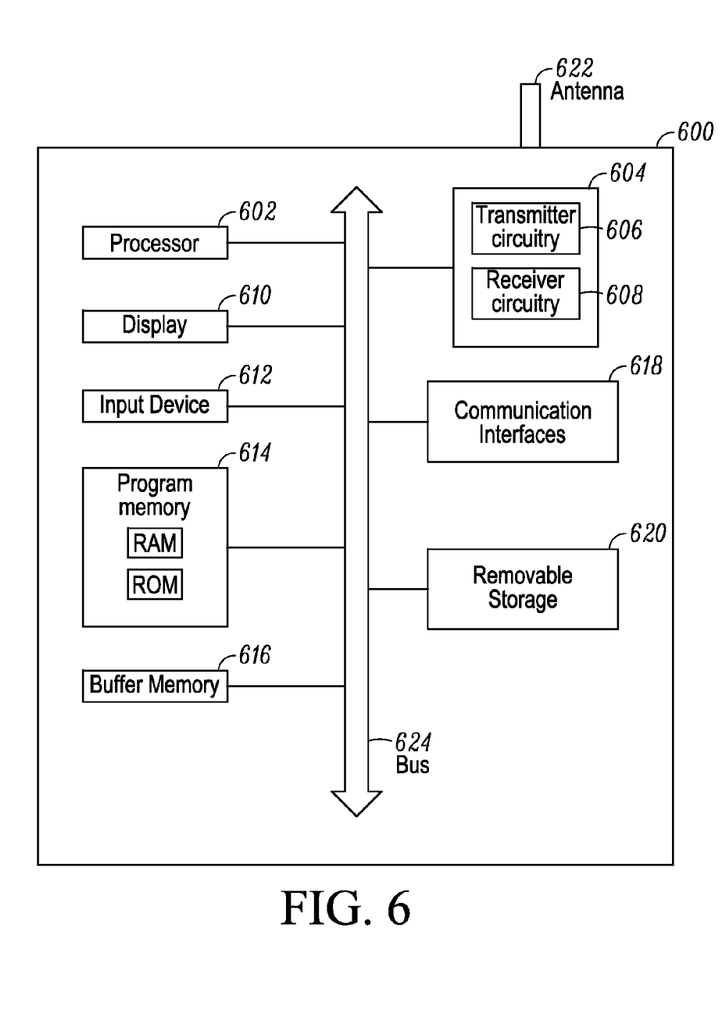
FIG. 6 shows an interference device according to one embodiment.

One example of a block diagram of an interference device is shown in FIG. 6. The interference device 600 contains, among other components, a processor 602, a transceiver 604 including transmitter circuitry 606 and receiver circuitry 608, an antenna 622, a display 610, an input device(s) 612, a program memory 614 for storing operating instructions that are executed by the processor 602, a buffer memory 616, one or more communication interfaces 618, and a removable storage 620. The interference device 600 is preferably an integrated unit containing at least all the elements depicted in FIG. 6, as well as any other element necessary for the mobile device 600 to perform its electronic function. Alternatively, the interference device 600 may comprise a collection of appropriately interconnected units or devices, wherein such units or devices perform functions that are equivalent to the functions performed by the elements of the interference device 600. The electronic elements are connected by a bus 624.

The processor 602 preferably includes one or more microprocessors, microcontrollers, DSPs, state machines, logic circuitry, or any other device or devices that process information based on operational or programming instructions. Such operational or programming instructions are preferably stored in the program memory 614. The program memory 614 may be an IC memory chip containing any form of random access memory (RAM) or read only memory (ROM), a floppy disk, a compact disk (CD) ROM, a hard disk drive, a digital video disk (DVD), a flash memory card or any other medium for storing digital information. One of ordinary skill in the art will recognize that when the processor 602 has one or more of its functions performed by a state machine or logic circuitry, the memory 614 containing the corresponding operational instructions may be embedded within the state machine or logic circuitry. The operations performed by the processor 602 and the rest of the interference device 600 are described in detail below.

The transmitter circuitry 606 and the receiver circuitry 608 enable the interference device 600 to respectively transmit an interference signal and receive other communication signals. In this regard, the transmitter circuitry 606 and the receiver circuitry 608 include appropriate circuitry to enable wireless transmissions. The implementations of the transmitter circuitry 606 and the receiver circuitry 608 depend on the implementation of the interference device 600 and mobile devices with which it is to interfere. For example, the transmitter and receiver circuitry 606, 608 may be implemented as part of the interference device hardware and software architecture in accordance with known techniques. One of ordinary skill in the art will recognize that most, if not all, of the functions of the transmitter or receiver circuitry 606, 608 may be implemented in a processor, such as the processor 602. However, the processor 602, the transmitter circuitry 606, and the receiver circuitry 608 have been artificially partitioned herein to facilitate a better understanding.

The antenna 622 comprises any known or developed structure for radiating and receiving electromagnetic energy at the interference frequency. The buffer memory 616 may be any form of volatile memory, such as RAM, and is used for temporarily storing received information. The display 610 may be an LCD, OLED, or any other known display. The input devices 612 include one or more speakers and microphones and may further include an alpha-numeric keyboard, isolated buttons, soft and/or hard keys, touch screen, jog wheel, and/or any other known input device.

Although embodiments have been presented in which a signal is constantly transmitted from the interference device, the interference device may be manually or automatically activated/deactivated at predetermined times or after certain incidents occur. For example, it may be desired to block calls only during predetermined time periods (e.g., in an area during events or only during certain hours) and allow them at other times. In other examples, being activated after the first call has been sensed to have been made/received or being deactivated after a predetermined amount of time (e.g., 1, 5, 10 minutes) after the last attempt has been sensed to have been made. In these latter examples, however, this method may be used with other techniques, such as sensing or other blocking methods, to ensure blocking proper of calls. The interference device may be activated locally or remotely and may be mobile or fixed in a particular location. Similarly, although mobile devices such as cell phones and PDAs have been described as being interfered with, other mobile or fixed devices may be deliberately subjected to jamming In various embodiments, some of the disclosed methods may be implemented as a computer program product for use with a communication device (e.g., loaded into memory and the algorithm followed by a digital signal processor of the communication device). Such implementations may include a series of computer instructions fixed either on a tangible medium, such as a computer readable medium (e.g., a diskette, CD-ROM, ROM, or fixed disk). The medium may be a tangible medium (e.g., optical or analog communications lines). The series of computer instructions embodies all or part of the functionality previously described herein with respect to the device. Such computer instructions can be written in a number of programming languages for use with many device architectures or operating systems. Furthermore, such instructions may be stored in any memory device, such as semiconductor, magnetic, optical or other memory. It is expected that such a computer program product may be distributed as a removable medium with accompanying printed or electronic documentation (e.g., shrink wrapped software) or preloaded with a device (e.g., on system ROM or fixed disk). Of course, some embodiments of the invention may be implemented as a combination of both software (e.g., a computer program product) and hardware. Still other embodiments of the invention are implemented as entirely hardware, or entirely software (e.g., a computer program product).

Those skilled in the art will recognize that a wide variety of modifications, alterations, and combinations can be made with respect to the above described embodiments without departing from the spirit and scope of the invention defined by the claims, and that such modifications, alterations, and combinations are to be viewed as being within the scope of the inventive concept. Thus, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by any claims issuing from this application and all equivalents of those issued claims.

The invention claimed is:

1. A method of scrambling a communication from a Universal Mobile Telecommunications Method (UMTS) base station, the method comprising:
   receiving a transmitted signal from the base station intended for a communication device during initiation of a communication session between the base station and the communication device, the transmitted signal containing a Secondary Common Control Physical Channel (S-CCPCH), the S-CCPCH formed of a frame of slots each having a Transport Format Combination (TFC) field containing a Transport Format Combination Indicator (TFCI) and followed by a data field containing data;

determining characteristics of the S-CCPCH;

altering the characteristics of the S-CCPCH to produce an altered signal; and transmitting a jamming signal based on the altered signal to the communication device to interfere with the transmitted signal received by the communication device.

2. The method of claim 1, wherein determining characteristics of the S-CCPCH comprises determining the TFCI of a plurality of the slots and altering the characteristics of the S-CCPCH comprises changing the TFCI of each of the plurality of the slots to a different value.

3. The method of claim 2, wherein altering the characteristics of the S-CCPCH further comprises changing the TFCI of each of the plurality of the slots without altering the data in the data field of each slot.

4. The method of claim 2, wherein altering the characteristics of the S-CCPCH further comprises changing the TFCI of each of the plurality of the slots without determining the data in the data field of the plurality of the slots.

5. The method of claim 1, wherein determining characteristics of the S-CCPCH comprises determining the TFCI and at least a minimum number of data values in the data field of a plurality of the slots, and altering the characteristics of the S-CCPCH comprises changing the at least a minimum number of data values in the data field of each of the plurality of the slots without changing all of the data values in the data field.

6. The method of claim 5, wherein the data values changed in the data field are located adjacent to each other in an original signal encoded by the base station to form the transmitted signal but not located adjacent to each other in the transmitted signal.

7. The method of claim 6, wherein the at least a minimum number of data values are changed without first reforming the original signal.

8. The method of claim 5, wherein changing the at least the minimum number of data values comprises changing only the minimum number of data values of each of the plurality of the slots.

9. The method of claim 8, wherein the minimum number of data value of a particular slot depends on the TCFI of the particular slot.

10. The method of claim 8, wherein the at least the minimum number of data values of a particular slot include either the initial data bits or near the initial data bits in the particular slot.

11. The method of claim 1, further comprising by generating time-shifted copies of the altered signal and multiplexing the time-shifted copies together to form the jamming signal.

12. An interference device comprising:

a receiver configured to receive a transmitted signal from a Universal Mobile Telecommunications Method (UMTS) base station, the transmitted signal intended for a communication device during initiation of a communication session between the base station and the communication device, the transmitted signal containing a Secondary Common Control Physical Channel (S-CCPCH), the S-CCPCH formed of slots each having a Transport Format Combination (TFC) field containing a Transport Format Combination Indicator (TFCI) and followed by a data field containing data;

a processor configure to determine the TFCI of each slot and alter characteristics of each slot based on the determined TFCI to produce an altered signal; and a transmitter configured to transmit a jamming signal based on the altered signal to interfere with the transmitted signal.

13. The interference device of claim 12, wherein the processor is configured to alter the characteristics of each slot by changing the TFCI of each slot to a different value.

14. The interference device of claim 13, wherein the processor is configured to change the TFCI of each slot without altering the data in the data field of each slot.

15. The interference device of claim 14, wherein the processor is configured to change the TFCI of each slot without determining the data in the data field of each slot.

16. The interference device of claim 12, wherein the processor is configured to determine at least a minimum number of data values in the data field of a plurality of the slots and change the at least a minimum number of data values in the data field of each slot without changing all of the data values in the data field, the data values changed in the data field located adjacent to each other in an original signal encoded by the base station to form the transmitted signal but not located adjacent to each other in the transmitted signal.

17. The interference device of claim 16, wherein the processor is configured to change at least a minimum number of data values without first reforming the original signal.

18. The interference device of claim 16, wherein the processor is configured to change only the minimum number of data values of each slot.

19. The interference device of claim 16, wherein the minimum number of data value of a particular slot depends on the TCFI of the particular slot.

20. The interference device of claim 12, further comprising:

a plurality of time shifters each of which is configured to receive the altered signal and time shift the altered signal to generate time-shifted copies of the altered signal; and a multiplexer configured to receive the time-shifted copies and multiplex the time-shifted copies together to form the jamming signal.

* * * * *

UNITED STATES PATENT AND TRADEMARK OFFICE
CERTIFICATE OF CORRECTION

| | | |
|---|---|---|
| PATENT NO. | : 8,260,190 B2 | |
| APPLICATION NO. | : 12/577872 | |
| DATED | : September 4, 2012 | |
| INVENTOR(S) | : Johnson et al. | |

It is certified that error appears in the above-identified patent and that said Letters Patent is hereby corrected as shown below:

On the Title Page, in Item (57), under "ABSTRACT", in Column 2, Line 6, delete "TCFI" and insert -- TFCI --, therefor at each occurrence throughout the Patent.

In Column 5, Line 21, delete "determined" and insert -- determined. --, therefor.

In Column 10, Line 3, delete "jamming" and insert -- jamming. --, therefor.

In Column 12, Line 16, delete "jamming" and insert -- jamming. --, therefor.

In Column 12, Line 61, in Claim 1, delete "Method" and insert -- System --, therefor.

In Column 14, Line 3, in Claim 12, delete "Method" and insert -- System --, therefor.

Signed and Sealed this
Fifth Day of February, 2013

Teresa Stanek Rea
*Acting Director of the United States Patent and Trademark Office*